(12) United States Patent
Cameron et al.

(10) Patent No.: US 9,361,297 B2
(45) Date of Patent: Jun. 7, 2016

(54) WEB SERVICE-BASED, DATA BINDING ABSTRACTION METHOD

(75) Inventors: Stefan Cameron, Ottawa (CA); Kevin Paul Matassa, Ottawa (CA)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1764 days.

(21) Appl. No.: 12/512,771

(22) Filed: Jul. 30, 2009

(65) Prior Publication Data

US 2014/0032484 A1 Jan. 30, 2014

(51) Int. Cl.
*G06F 17/30* (2006.01)

(52) U.S. Cl.
CPC ...... *G06F 17/30014* (2013.01); *G06F 17/3089* (2013.01); *G06F 17/30893* (2013.01)

(58) Field of Classification Search
CPC .......... G06F 17/30014; G06F 17/3089; G06F 17/30893; G06F 17/30398; G06F 17/243; G06F 17/246
USPC ................... 707/795, 793, 796, 808, 999.101
See application file for complete search history.

(56) References Cited

U.S. PATENT DOCUMENTS

| | | | |
|---|---|---|---|
| 5,996,076 A * | 11/1999 | Rowney et al. | 713/156 |
| 7,107,268 B1 * | 9/2006 | Zawadzki et al. | |
| 7,194,473 B1 * | 3/2007 | Hichwa et al. | |
| 7,873,569 B1 * | 1/2011 | Cahn | 705/38 |
| 2005/0108625 A1 * | 5/2005 | Bhogal et al. | 715/505 |
| 2005/0183003 A1 * | 8/2005 | Peri | 715/507 |
| 2006/0064313 A1 * | 3/2006 | Steinbarth et al. | 705/1 |
| 2007/0050489 A1 * | 3/2007 | Dowedeit | 709/223 |
| 2007/0157083 A1 * | 7/2007 | Roy et al. | 715/522 |
| 2009/0183117 A1 * | 7/2009 | Chang | 715/810 |
| 2010/0313119 A1 * | 12/2010 | Baldwin et al. | 715/256 |

* cited by examiner

*Primary Examiner* — Mohammed R Uddin
(74) *Attorney, Agent, or Firm* — Shook, Hardy & Bacon L.L.P.

(57) ABSTRACT

A method for providing a data binding abstraction. The method includes serving an interactive document via a digital data communications network using a server. The method includes generating, with intelligence in the document, a data binding request to resolve a data value placeholder that has no static data location or source reference. With a data binding web service, the method includes generating a data dictionary request that includes a placeholder identifier. The method includes using the data binding web service to process a data dictionary response which includes placeholder content for the placeholder to determine a source of the data value. The method includes the data binding web service accessing the determined data source to obtain the data value and providing the interactive document with a response including the placeholder identifier and the resolved placeholder data value. The interactive document then replaces the placeholders with the returned data value.

20 Claims, 6 Drawing Sheets

WEB SERVICE-BASED, DATA BINDING ABSTRACTION METHOD

BACKGROUND

1. Field

The present disclosure relates, in general, to computer-implemented methods for generating documents and forms such as fillable forms that may be served over the Internet or other network and for generating templates used to produce or render such documents, and, more particularly, to improved methods for binding or linking data such as enterprise or company data assets to documents and templates.

2. Relevant Background

With the growing use of communications networks such as the Internet, it has become more common for companies and other users to serve electronic forms or documents in a variety of forms over networks to clients, customers, or other end users. The end users may use a computer or other electronic device and a browser running on this device to access a web page, for example, to view a form or document and to complete the form and then submit the form data back to a web server for processing of the data.

For example, a client of a web service provider may provide insurance information using such a served form or a customer may provide credit card or other purchasing information to complete a purchase via a fillable form. In other cases, enterprises or businesses may allow employees to generate letters or packages that are then transmitted to recipients such as customers on a large customer list using such fillable form or document. Often, these fillable forms or documents are rendered or created as document, letter, package, or form templates and during rendering, data may be retrieved from a data source and merged into the template to create a document or form to be served to a client device. It has often been difficult during rendering to properly link the data references (or data called for) in the template to a proper data source, especially when the location of the data or data source may change over time.

Briefly, a data binding method is provided that may be computer implemented, such as via use of a data binding web service, to provide data bindings within a template or similar application. The data bindings may be abstracted using data dictionary (DD) information or entries and web services that act to resolve the DD entries into actual data values by accessing an appropriate data store or data source. In brief, the method involves steps or processes that replace static data binding references that were placed in each template by adding an indirection using placeholders that may be managed globally via a corporate or enterprise data dictionary. The placeholders are subsequently replaced in the method with data (e.g., enterprise or corporate data or the like) outside of the particular templates. When a location of the data in an enterprise (or template user's system) changes, only the web service's backend implementation is altered to reflect the change in data location(s) such that all templates may continue to retrieve data for placeholders from the data dictionary via a previously defined, generic web service call.

More particularly, a computer-implemented method is provided allowing an online or electronic document to use abstracted data binding. The method includes serving an interactive document to a client or network node device via a digital data communications network/link using a server or computer. The interactive document may be rendered from a template and include a data field with a placeholder (PH) for a data value. The method may further include generating, with intelligence such as an initialization script or data binding request function provided in/with the document or document instruction/code set, a data binding request to resolve the placeholder into the data value. Then, with a data binding web service that may be provided with code devices/instructions executed by the same or a differing server, the method may include generating a data dictionary request that includes an identifier for the placeholder (which may be provided with the data binding request along with request resolution data such as a customer identifier, process data from the document provided by an operator of the client during document filling/interaction activities, or the like).

The method may further include using the data binding web service to process a data dictionary response, which includes placeholder content for the placeholder associated with the placeholder identifier, to determine a source of the data value and/or a location of the data source. The method also includes the data binding web service accessing the determined data source to obtain the data value and then providing to the interactive document a data binding response including the placeholder identifier and the resolved placeholder data value. In some implementations, the serving of the interactive document may include rendering in runtime the interactive document from a previously stored/created template, with the template designed such that a plurality of data fields are included in document content (such as letter paragraphs or the like) each including a data value placeholder but without a static data binding reference for the data value (as may have been the case with prior fillable forms or documents). The data binding request may include request resolution data such as a customer ID, process data from the document being filled by operation of the client, or the like, and this resolution data may be used by the data binding web service to access the data source and/or to resolve the data value (e.g., query a data source with a customer ID along with PH content from a data dictionary).

In some embodiments of the method, the data dictionary response may be generated by a data dictionary wet) service that provides an interface to a data dictionary database, which includes entries with placeholder identifiers and a set of placeholder content, such as information useful by the data binding web service in accessing the data source (e.g., a source identifier for the placeholder). Typically, the data dictionary database would be designed such that its data entries also provide no static bindings or references to the location of the data source, whereby the location of the source may be changed without requiring changes to the data dictionary database and its entries. In the above manner, the method abstracts data binding from the interactive document such that the document has no knowledge of the source of the data value, and, in some cases, the data dictionary database and DD web service also have not stating reference or data binding to the source, with the data binding web service acting to provide lists of placeholder IDs to hydrate to the DD web service, to process hydrated PH objects returned from the DD web service to determine the data source/data location, and to access the data source and return placeholder data values to the document.

DETAILED DESCRIPTION

Figure 1:
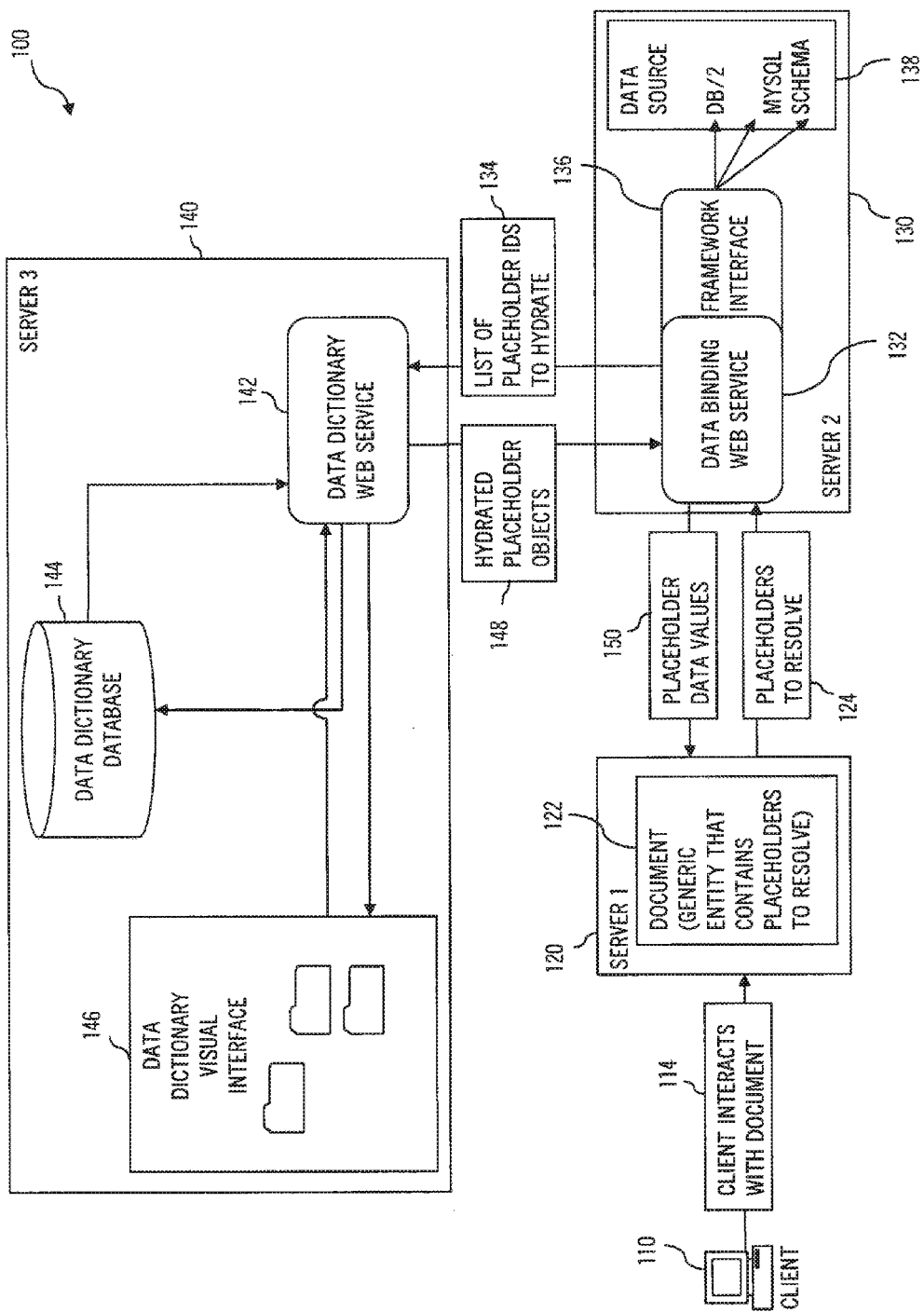
FIG. 1 illustrates in functional block form a computer system or network implementing a web service-based data binding with abstraction techniques as described herein.

The following description describes the use of software (and/or hardware) implementations to provide a web service data binding abstraction to enhance creation or design of templates. In some cases, it is useful to provide a way to reference data such as data used in templates. For example, it may be useful to better link data that is referenced in a template to a location in data storage or memory devices. In some cases, the linking method is adapted to assist users or operators of a computer system, and its template design tools, to more easily build templates (such as for letters or packages) that may utilize nearly any kind or type of data to generate documents.

It may be difficult to bind or link data or data assets to a template of a letter, form, or package. In some cases, a data source may be provided that stores data that may later be merged into a template to create or render a document, package, or form. One binding technique that may be used during template design or production is to include or insert data placeholders in the template (such as user friendly data names such as "Dear {First Name}," "Mr. {Last Name}," and so on) that had no particular tie to any specific data source. Then, a software module or binding engine may be run that inspects each template in which data placeholders have been included and make appropriate data bindings to a particular data source and/or location of data corresponding to each data placeholder by looking up the placeholder in a data location database. A flaw with this approach is that it called for the binding module or engine to modify each and every template in order to set the correct data bindings for each placeholder. Issues then may arise when a location of the bound data is changed because now every template and rendered document or form has to be updated manually to fix all the bindings. This may take countless hours of hard labor and frustration would undoubtedly ensue even for relatively small applications involving hundreds of templates and documents let alone for larger enterprises where thousands of manual fixes may be required. In some cases, the templates may not have to be corrected with updates to the entries in the data location database being performed to point to a new location of the data, but this technique does not work in most cases due to the nature of data bindings as such bindings cannot be modified in real time once a template has been rendered into a document into which live data is inserted (e.g., modifying links provided by templates would not fix improper data bindings in documents that have already been rendered using the templates).

The following description provides an enhanced method by which data bindings in templates may be abstracted using information in a data dictionary or location reference database and web services to resolve entries in the data dictionary to actual data values. Such a method or implementation is useful because, as discussed above, making changes in bindings at run-time is often too late since these bindings are evaluated by a run-time engine at a set point in time. Embodiments of the proposed solution may specifically address this issue since the resolution of bindings is designed to occur as part of the run-time processing. For example, an implementation of one embodiment of the solution has the result of all bindings looking to a data binding web service (DBWS) or data binding web service (DBWS) module run by one or more processors. From there, the location of the data, typically stored directly in the bindings, may change at any time. As far as the form (or runtime document or interactive document) is concerned, the binding does not change.

In the code, a traditional data binding may look like: <bind match="dataRef" ref="$.customer.company"/>. This is a fixed binding to a node in the data which is:

```
<{dataRoot}>
    <customer>
        <company>
    </customer>
</{dataRoot}>
```

This binding cannot be altered at runtime. If the field needed to import and export data from another data node, it could not be done. In one solution described herein, the binding may look instead like:

```
(request)
<connect connection="DataBindingWebService"
usage="exportOnly" ref="$.phList"/>
(response)
<connect    connection="DataBindingWebService"
usage="importOnly" ref="$.resolvedPhList"/>
```

Behind the DBWS call, if the data location changed from "//customer/company" to "//client/workplace", for example, the exemplary implementation would take care of it and the form/document itself would be oblivious to the change, effectively and transparently altering the "binding" at runtime.

In this description, it may be useful to provide definitions for a number of terms. The term "template" as used herein is generally an electronic or digital data version or set of code/instructions for providing a letter, package, fillable form, or the like that may be stored in a data store or memory in a form corresponding to a design-time form prior to being rendered. Design-time form may be, for example, an XML forms architecture (XFA) template that defines the presentation and behavior of the form/document. At design-time, these attributes are able to be modified, but there is no actual instantiation or rendering of the form/document. In the context of Adobe LiveCycle®, for example, a form "template" describes the basis for a (not "the") runtime version of that form. The runtime form may take on different variations depending on changes to a form document object model (DOM) via script and/or data. The basis for the form DOM (generated at runtime) is its template, which is defined/modified at design-time only. In other words, the template typically does not change, with the deltas or changes that provide runtime variations going into the form DOM.

The term "document" may be an electronic version or set of code/instructions in a runtime form after rendering (e.g., a runtime document or interactive document) such as a letter filling experience provided based on rendering of a template. Content is typically any data, code, or other components/items that may be included in a template. A data dictionary or data dictionary database may be a collection of placeholders that represent data that may be included in a document built from a template. A data binding web service generally may be a web service that is responsible for the abstraction of the data bindings between a data dictionary placeholder and its resolved data value. A data dictionary web service may be a web service that is responsible for creating, modifying, and accessing placeholders in the data dictionary (e.g., to create hydrated placeholder objects from lists of placeholder identifiers or IDs).

FIG. 1 illustrates a computer system or network 100 as may be used by an enterprise to serve numerous documents to clients 110 for them to fill (such as in an e-commerce setting with fillable forms), for them to modify and transmit/use (such as when generating company letters, advertising mailers, and the like), or for them to otherwise interact with an electronic set of data after it has been rendered from a template. Such interaction is shown at 114 and may include a client (or user/operator of a client node or network connection device) 110 requesting a document 122 and providing data to modify or complete the document 122. The system 100 is also shown to include a first server or document server 120 that functions to respond to client 110 requests for documents and, in response, to retrieve and/or provide runtime documents 122 (templates that have been rendered into documents such as interactive documents, forms, letters, or packages).

Each runtime or served document 122 may be considered a relatively generic entity that includes data placeholders that can be resolved as described herein to data values by an abstracted data binding process. Each form or document 122 is designed to have the intelligence or code modules/instructions that may be run to generate data binding web service requests to resolve a list or set of placeholders into data values (which may then be merged into the document 122 by the server 120 or one or more software components run by the server 120), as shown at 124. What a document 122 is or what configuration it will take may differ depending on a particular implementation of the system 100. For example, when the system 100 is adapted to provide a correspondence management system or implementation, the document 122 may be an XFA form or other form document with data fields that each has one or more placeholder (PH) identifiers (IDs). Each PH ID may be resolved during use of the document by sending a PH resolution request to a data binding web service 132 running or provided on a second server 130 in the system 100. In another implementation, the document 122 may include an eXtensible Markup Language (XML) representation of a package to build that contains various PH IDs that may be resolved as part of building or generating the package or document 122.

Further, each document 122 typically has one or more software modules/code or instruction sets/intelligence that may be implementation-specific that enables it to submit a list of PH IDs in a request 124 to the data binding web service 132. Further, each document 122 may have one or more software modules/code or instruction sets/intelligence components that function to receive a list of resolved PH data values for each requested PH ID as shown at 150 in a data binding response from the data binding web service 132.

Servers 120, 130 may be communicatively linked directly or by a digital communications network such as a local area network (LAN), a wide area network (WAN), an Intranet, the Internet, or other such network in a wired or wireless manner as may the client 110 be connected to the server 120. In some embodiments, the document 122 has no knowledge of what happens or the resolving processes occurring in or behind the data binding web service 132.

The system 100 further includes a third server 140 that includes data storage storing a data dictionary database 144. The term "server" as used herein is intended to cover any computer or electronic device that may include one or more processors, data storage and memory for storing code devices or instructions that may be run or used to cause the server or computer to perform particular tasks, and input and output devices for receiving user input and outputting or displaying information such as one or more user interfaces or graphical user interfaces (GUIs) as shown with a data dictionary visual interface 146 that may be generated to facilitate creation or utilization of the data dictionary database 144. As shown, the server 140 also runs or provides a data dictionary web service 142 that interacts with the data binding web service 132 and with the data dictionary database 144 as discussed herein. Three servers 120, 130, 140 are shown but a greater or smaller number may be used to practice the system 100 and provide the functions described in the process of FIG. 2. In other words, the location of the document 122, the data binding web service 132, the data dictionary web service 142, and the data dictionary database 144 is not limiting to the system 100 as these components typically communicate via web service calls.

When the data binding web service 132 receives a requested list of PH IDs 124, the data binding web service 132 interacts as shown at 134 and 148 with the data dictionary web service 142 to hydrate the list of PH IDs into a list of rich PH objects 148 that contain all PH-related information and that are communicated to or returned to the data binding web service 132. The data dictionary web service 142 accesses the data dictionary database 144 with the PH ID list 134 to create the PH objects 148. Once the list of PH objects 148 is obtained, the data binding web service 132 males a call via a framework interface 136 provided on the server 130 into a data source 138, which contains (or is the location of) actual data or enterprise data assets. The interface 136 may be a custom implementation, as shown, with solution-specific code that interacts with a particular data source or back-end entity 138 in order to get the data necessary to resolve the PH values as shown at 150. The call from the interface 136 returns a list of resolved PH objects (i.e., the objects now contain their resolved data values based on solution-specific data sources 138 that may be sitting or residing behind the interface 136). The data binding web service 132 may then respond to the document's request 124 with a data binding response 1550 that includes a list of resolved PH values. Once the document 122 has received the response 150 (which contains the resolved PH data values) from the data binding web service 132, the document replaces each placeholder (in data fields, in particular content, or the like) with its pertaining or corresponding resolved data value. Note that in some cases, <data> is submitted to the DBWS 132 as part of the request 124, the data source 138 for the PI resolution may be the <data> node itself (and its contents), depending on the data it contains and what the PH represents.

Figure 2:
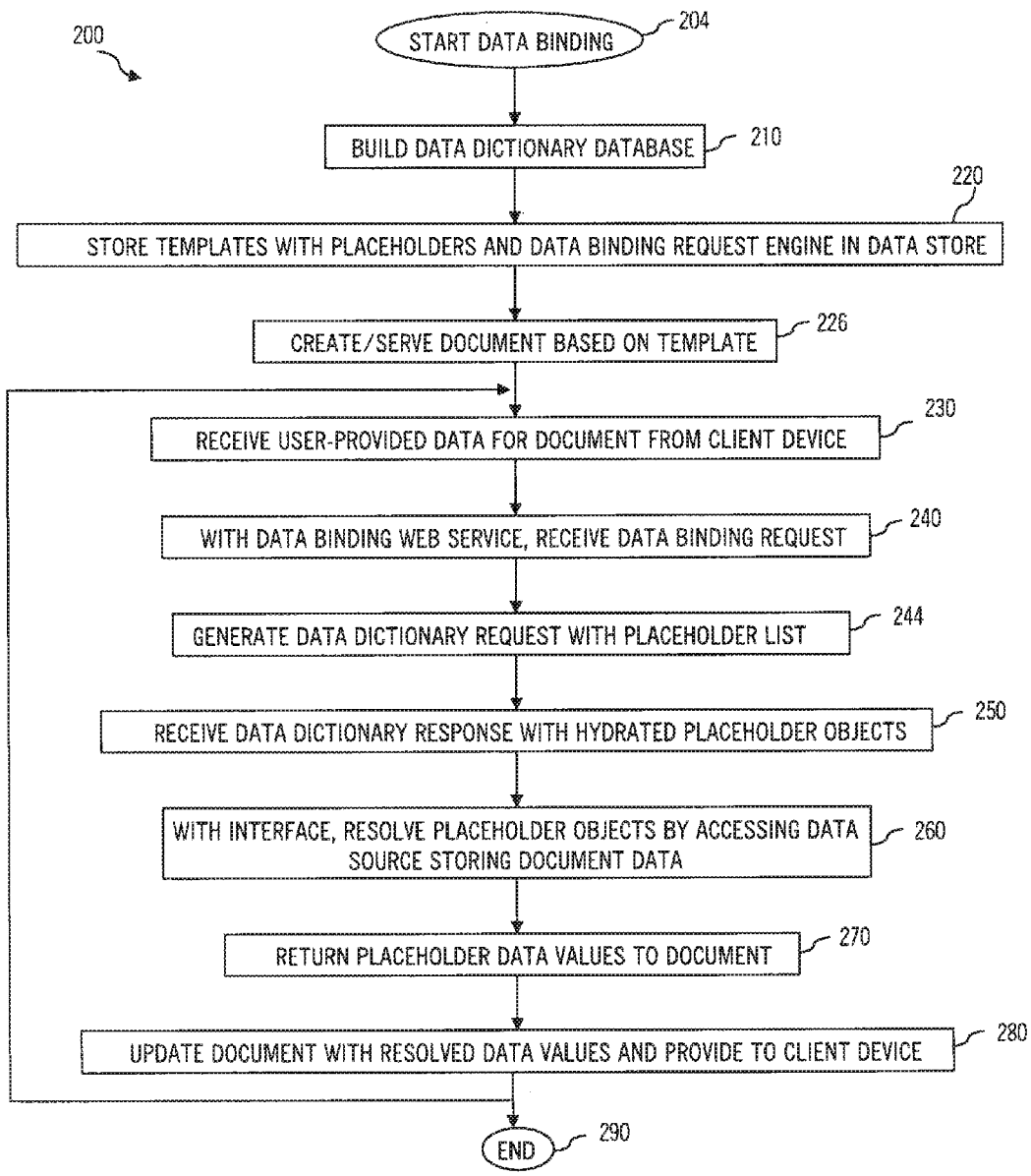
FIG. 2 illustrates a flow diagram of a data binding method such as may be implemented with the systems of FIGS. 1 and 7.

FIG. 2 illustrates a data binding process 200 with abstraction of data in a served document from a particular data asset storage location, as may be implemented by operation of the system 100 of FIG. 1 and other devices/components described herein. The data binding process 200 begins at 204 typically with a selection of the types of documents to be supported by the data binding, design/configuration of a data dictionary, and, in some cases, storing data in a data store (e.g., creation and storage of actual data or data assets that may later be retrieved/accessed to resolve placeholders in a document into placeholder data values). In step 210, the method 200 includes building a data dictionary database that may be stored in a system or network (e.g., a data storage device) so as to be accessible to respond to placeholder resolution requests.

As noted above, a data dictionary or DD database is generally a collection of placeholders that represent data that can be included in a document built from a template, and each entry may include a placeholder ID along with one or more fields with additional information or content that generally is not desirable to present in a document (e.g., too much information) and also information that is useful for the data binding web service to determine a data location in a data source. Building the data dictionary database at 210 may involve use of a UI such as UI 146 shown in FIG. 1, e.g., a picture of a tree of placeholders on the left and an editor for placeholder-related values on the right and buttons to add/insert/delete placeholders in the data dictionary database or the like. The data dictionary database is, in brief, a series of placeholders with related values. One way to define the data dictionary database would be as follows (with an XML example provided for ease of explanation and not as a limitation):

```
<dd>
    <ph id='{id}' text='{string}' type='*string|number|list'
        source='{string}' custom='{string}'>
        {Optional description}
    </ph>
</dd>
```

The example above shows a number of aspects of this exemplary data dictionary database and its placeholders. Each placeholder has a unique ID (@id) that is generated by the data dictionary application (e.g. that is not user specified). A placeholder entry may also include text to insert including optional boilerplate text (@text where { } are used to specify the single piece within the text that should be replaced with the data value and anything outside the { } is considered boilerplate that is not replaced with the data value). Each placeholder entry in the DD database may have a type (@type) that indicates the type of the data for the placeholder with a choice in this example of string (default, for textual data), number (for numeric data), and list (for the case where a list with multiple values may be associated with a placeholder and the user may choose from one of the choices that may be loaded from a data source).

Each placeholder entry may further include an optional source (@source) that may be used to help with coding the back-end web service operations of the data binding web service by providing a way to identify a set of placeholders that belong to a common data source (note, that this may simply be an ID specified by an administrator or administrator module that may be used at the back-end to identify a set of instructions to execute in order to retrieve the data for the placeholder). An optional custom field (@custom) may be provided and set to any arbitrary string that can help the back-end implementation or data binding web service in performing actions useful to reconcile a result as data into the placeholder. Also, each placeholder entry in the data dictionary database may include an optional description as he content of the <ph> node, which can be displayed in various UIs to help explain the use of a particular placeholder to a template generator or other users of the DD database.

At this point, it may be useful to provide a relatively simple example of a data dictionary database to assist in understanding how it may be used to generate fuller PH objects or hydrated PH objects from lists of PH IDs to assist in resolving a PH resolution or data bind request into a set of PH data values (which can then be merged into or used to replace the PHs in a document). The following is a sample DD with a few entries.

```
<dd>
    <ph id='1' text='Dear {First Name}' source='Query1'
        custom='firstName'/>
    <ph id='2' text='{Address}' source='Query1' custom='address'/>
    <ph id='3' text='{Credit Card type}' type='list' source='Query2'
        Custom='cardName'>
        Provides a list of credit cards to choose from.
    </ph>
</dd>
```

The above data dictionary or DD database has three entries that provide fuller forms of a placeholder (i.e., more information than typically would be desirable to be stored in a template for use in runtime rendering of the template into a document) that may be used to create hydrated PH objects from lists that include any of the three entries. The three entries may be resolved to the following values when the data binding web service uses its interface to call or access a corresponding data source (which may be located using the data location information in the PH entry in the DD database). The PH data values may be merged into the placeholders in the document produced from a template, and the values may be: (a) for PH ID '1', "Dear Steve"; (b) for PH ID '2', "343 Preston Street"; and (c) for PH ID '3', "Visa" as per choice made by a user interacting with the document on a client device from the choices "Visa, MasterCard, Amex".

The method 200 may continue at 220 with creating and storing templates that include placeholders (or, more accurately, PH IDs) in a data store or memory. The templates typically also would include intelligence/code that may be used by a computer or its processor to create a data binding request to be sent to a data binding web service and also to process a data binding response with placeholders resolved to their associated data values (e.g., a template and a document rendered using the template may include a data binding request engine and a data binding response processor or the like). Typically, placeholders (PHs) may be added to templates indirectly by including content, such as paragraphs of in a letter or the like, during template creation that itself includes PHs. In some cases, though, PHs may be added directly to a template. A processing instruction is used during the template creation to specify each PH's ID, type, and name (which may be generated based on the PH's text) from the data dictionary database in the location where it is included in the content of the template or in the template. The processing instruction may also be used during the authoring process of content that contains a placeholder (e.g., inserting a PH into a paragraph, which is saved as a fragment and, subsequently, inserted into a template, thereby indirectly inserting the PH into the template).

For example, in a letter template, the processing instructions may be converted into data fields. Each data field may be manufactured according to the information provided. Referring to the above DD database example, the processing instructions may be as follows (for an Adobe Correspondence Management (or CM) implementation): (1) <?cm DearFirstName id=1; type string?>; (2) <?cm Address id=2; type string?>; and (3) <?cm CreditCardType id=3; type=list?>. In the processing instructions above, the domain is "cm", the key is the name of a data field generated from the PH's @text, and the value is the @id and @type information.

Figure 3:
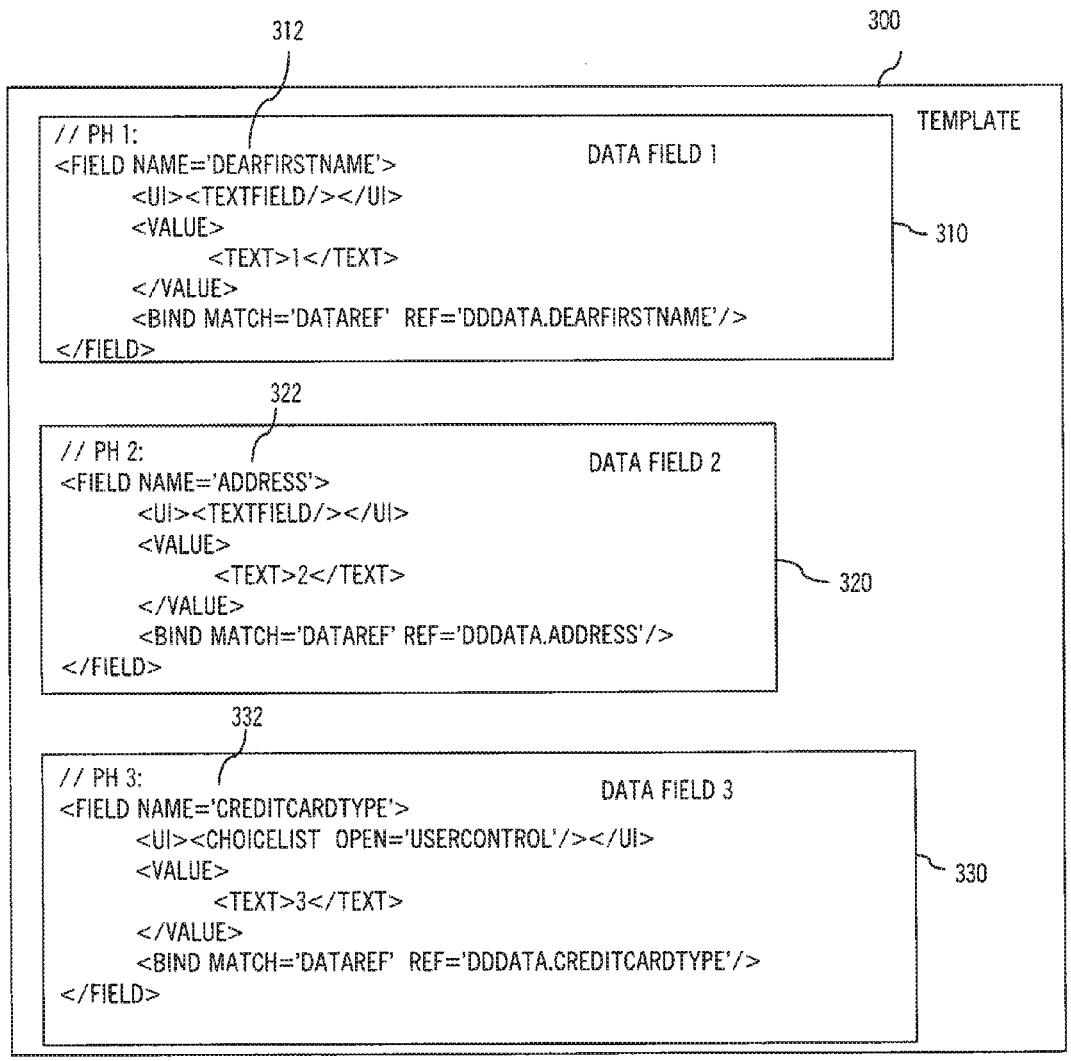
FIG. 3 illustrates a template showing data fields that may be used to provide placeholders in the template and later rendered documents.

FIG. 3 illustrates a template 300 that may be generated with this technique to include a first data field 310 with a placeholder ID 312 ("PH 1"), a second data field 320 with a placeholder ID 322 ("PH 2"), and a third data field 330 with a placeholder ID 332 ("PH 3"), each of which may be provided indirectly during creation of the template in content with a PH ID. As shown PH 1 and PH 2 became text fields because of the string type and PH 3 became a drop down list because of the list type. In each case, the default value of each data field 310, 320, 330 is the unique PH ID 312, 322, 332. The intent here may be that the PH resolution algorithm in the template may first look for the existence of the field's data node (as may be suggested by its data binding). If it does not exist, then data was not retrieved from the DBWS and the field's default value may be used as the PH ID for the request (otherwise, the request does not take place and the field's value is set according to its data binding into the ddData space for example). An XML data binding is also set for each inside the designated 'ddData' space (data dictionary data space) where the bound data node is the name of the data field that was generated based on the PH @text information. In this case, the XML data binding was used such that resolved PH data is retained and does not have to be re-resolved. In some letter filling implementations, XML data is submitted back to another process, and the XML data may contain the resolved PH data so that when the XML data is merged back into the letter template to generate the resulting letter, the PH data is exactly like what had been previewed. Further, if the PH data is collected, the process may more easily use an XPath expression or the like into the submitted XML data in order to extract the PH data of interest (e.g., in the case of the credit card type list, the process may want to capture the type selected by the user during letter or form filling interactions).

The method 200 may continue with creating or serving a document by rendering a template created in step 220. As shown, in FIG. 1, the document 122 may be presented on a server 120 that is accessible by a number of users or operators of client devices 110. At 230, the method 200 includes receiving user-provided data or interaction input for the served document via a client device (or an I/O component of the server serving the document), e.g., a user identifier, a selection of a credit card type, information based on the fillable fields of the document, and so on. Note that step 230 may be useful such as when the data retrieved was user-specific, but there are many times when the document may immediately go out to the DBWS and get resolved placeholder values without any initial data (e.g., company name, company address, and so on such that step 230, which may be considered optional, is not required for the method 200 to be performed properly in many cases).

At 240, with a data binding web service, the method 200 continues with receiving a data binding request (e.g., from code/intelligence in the document served in step 230). Typically, the request is created and sent by the document or code/modules in the runtime version of the document (which is rendered from the template). Once the list of placeholders in the template is established, such as by having data fields created according to processing instructions describing the PHs in use as discussed above, the data for the PHs may be retrieved, e.g., during letter or form filling-type interaction with a user operating a client node. This may be accomplished by calling a specific web service (such as data binding web service 132 shown in FIG. 1) that may have a doc/literal function (e.g., some implementation including form template web service data connections may support doc/literal) that accepts a list of PH IDs as the request and responds with a list of PH IDs and their associated, resolved data. Typically, the web service does not have to be doc/literal, e.g., it may be RPC-based or the like, with the doc/literal implementation being particularly useful within an XFA template and other applications.

In a letter filling implementation, for example, a letter template may have a predefined data connection to the data binding web service (or the doc/literal function of the web service). When the document or letter filling experience or interaction is initialized (e.g., a form initialize event or the like), the PH IDs may be collected and sent to the data binding web service as the data binding request or data binding web service request. PH ID collection may be from data fields (such as fields located inside content forms or subforms that may have complex content that contains fillable fields that are seeded with PH data, e.g., a fillable shipping address block where the fields are seeded with the customer's address that may be on file or stored at a particular location in a data source accessible by the data binding web service). In one embodiments, a script (or other modules/code) embedded in the letter template may take care of collecting the PH IDs and execute the request on the data binding web service. The timing of the resolution of the placeholders into data may be varied to practice the data binding method 200 (such as by customizing the template script or the like to set a timing of PH resolving).

Figure 4:
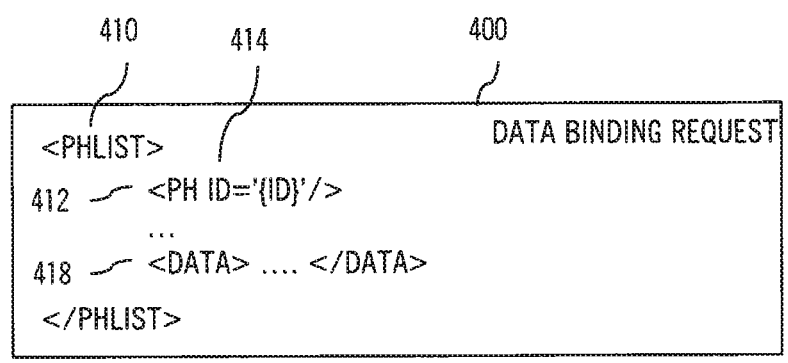
FIG. 4 illustrates an exemplary data binding request as may be generated by a document and received/processed by a data binding web service.

The data binding web service request provided at step 240 may contain a list of PH IDs to resolve and may, depending on how the data is being fetched, contain an optional data node that contains the data in the case where the data comes from the process that launched the document (or form/letter filling experience). FIG. 4 illustrates one exemplary implementation of a data binding web service request 400. The request 400 in this example is a single XML-encoded string and may be thought of as a "non-hydrated" list of PH IDs. The use of an XML-encoded string may be useful in some cases because it is dynamically generated at runtime of the document, and the data binding web service may be invoked programmatically without using import/export bindings on the data fields. As shown in FIG. 4, in the PH list 410, there may be one PH node 412 per data field of a template or document with a PH ID 414. This information is processed at 240 by the data binding web service to determine which placeholders are being requested (or which PHs will be resolved into data values).

A data node 418 may be included in the request 400 and may be used to pass a variety of data (e.g., in a letter/form filling experience or application the current document object model (DOM) content may be passed into the web service via the data node 418). The data in node 418 may contain data initially merged into the document (or letter/form filling experience or application) that may include information that may be used to resolve the PHs into data values. For example, in order to resolve PH ID 1, in the above examples, a customer ID may be included in the data so that the data binding web service may perform an appropriate query in order to retrieve data for a specific customer that might be the intended recipient of the letter being built or be the user filling the form/document or the like. The data used to resolve the PHs by the data binding web service may be the process data itself (e.g., the data initially merged into the document or filling experience/implementation), in which case the data node 418 may also provide a way to get that data to the data binding web service so that the placeholders in the list 410 may be resolved. Typically, the document itself that generates the request 400 may be unaware of how the placeholders in the list 410 will be resolved to their respective values. In the example provided above, a data binding request 400 (manufactured by the initialization script, for example, in a PDF within a form/letter filling experience) may contain a PH list 410 including the following PH nodes 412 with IDs 414: "<ph id='1'/> <ph id='2'/> <ph id='3'/> " and the following data node 418: "<data> <customerID>abc123</customerID> </data>".

The data binding method 200 of FIG. 2 continues at 244 with generating a data dictionary request or data dictionary web service request, and the DD request may be generated by the data binding web service based on the data binding request received in step 240 and may include a list of PHs extracted from the data binding request. The data binding web service may be implemented with a resolve placeholders engine or function (such as a doc/literal function) that accepts a data binding request (e.g., an XML-encoded string as the request) and returns a set of resolved placeholder data values as the data binding response (e.g., an XML-encoded string as the response). When the data binding request is received in step 240, the data binding web service may convert the XML-encoded string of PH IDs into a rich collection of PH objects by cross-referencing the PH IDs with entries in a data dictionary database via a data dictionary web service such as by generating a DD request.

In some embodiments, in order to provide a way for the PH IDs to be cross-referenced with the DD database, a data dictionary web service (such as service 142 of FIG. 1) may be exposed via a web service interface in order serve this type of DD request. The data dictionary web service may uses a retrieve placeholders engine or function may act (between steps 244 and 250) to process or accept a DD request with an array of PH IDs, to access the DD database with this PH ID list, and to return a corresponding array of PH attributes (e.g., fully hydrated PH objects). The retrieve placeholders function may again be in doc/literal format to support particular implementations.

Figure 5:
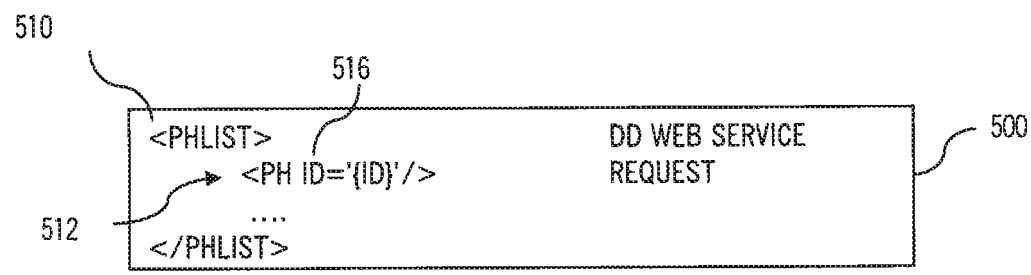
FIG. 5 illustrates a data dictionary web service request that may be generated by a data binding web service as part of a data binding process.

FIG. 5 illustrates an exemplary data dictionary web service request 500 that may be generated by the data binding web service and processed by the DD web service. As shown, the request 500 would include a list of placeholders 510, and in this list 510, there may be one PH node 512 per data field and each node 512 may include a PH ID 516. This information would be used by the DD web service to determine which placeholders are being requested (or which PHs to hydrate with further information such as source location information) and is consistent with the request format of the data binding web service (e.g., similar except for a data node). Additionally, the request 500 may include a section for arbitrary data such as <data> for the <phList> from the template to the DBWS. In one exemplary implementation, a special key or username/password may be provided in order to access the DDWS, and this information may be provided via the <phList> request 500 to the DDWS.

Figure 6:
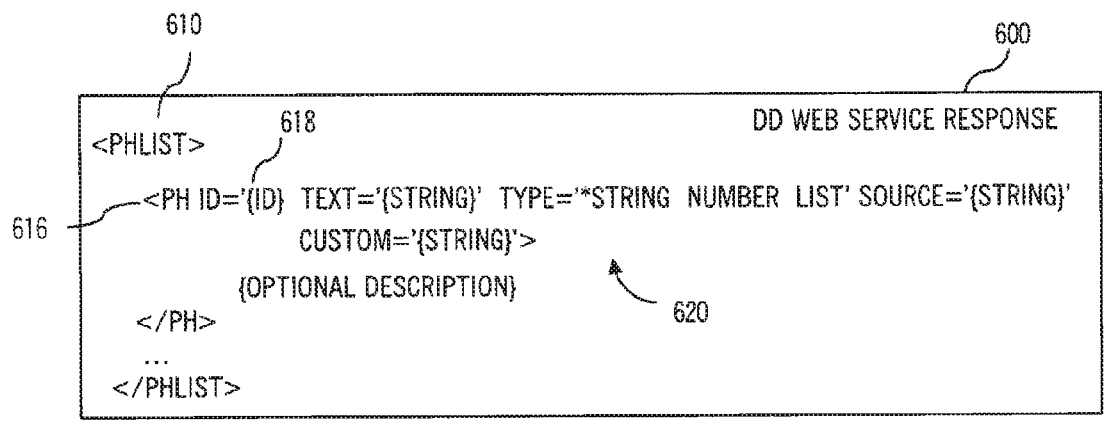
FIG. 6 illustrates a data dictionary web service response that may be generated by a data dictionary web service and provided to a data binding web service to perform data binding or resolve a list of placeholders with corresponding data from a data source or data store.

FIG. 6 illustrates an exemplary data dictionary web service response 600 that may be returned by the DD web service such as a single XML-encoded string structured as shown in FIG. 6. The response 600 includes a list of placeholders 610 corresponding to the list 510 in the request 500 with a PH nodes 616 that include a PH ID 618 as well as additional data or content 620 stored in the DD database that may be used to resolve the placeholder such as to identify a source and/or to generate the PH data values for merging into the requesting document. The PH node 616 in the response 600 may be identical in format to the PH node in the data dictionary database. Given that there are two web services in a typical data binding system (or that provide the functionality of method 200), this implies that each one could reside in different systems/servers/devices if desired. For example, the DD web service may be located on a system that holds legacy corporate data while the data binding web service may be located within a server rendering and/or serving the documents from templates. In other cases, though, the DD web service may be on nearly any machine such as the document server while the data binding web service may be on the machine/server that is closest to the actual data such as an MBM mainframe or the like that manages a database of data assets for an enterprise (e.g., a DB2 database or the like), which may place the data binding web service and data source of the data used to resolve placeholders on a single device or within a single box.

In step 260 of the method 200 of FIG. 2, the interface and/or data binding web service may act to resolve the placeholder objects by processing the hydrated PH objects in the DD response and also by accessing an identified/determined data source that is storing the data referred to or associated with each PH in the request list/array. The PHs with a specified @source attribute in the DD database may be grouped together and an interface function, such as interface 136 shown in FIG. 1, may be called to resolve the abstracted data bindings. The function may receive input such as data including the content of the data node that was part of the data binding request and a source that may be a common value of the @source attribute for all of the PHs in the list. The function may also provide as output (as well as receive as input) a list (or array/collection) of the PH objects pertaining to the specified source. An enterprise or system administrator may provide an implementation of the interface function providing instructions on how to handle various data sources. For example, the implementation may involve a switch statement on the data source that would call a function specific to the source.

Referring back to the ongoing example provided herein, PH ID 1 and PH ID 2 both have the same source ("Query1") while PH ID 3 has a different data source ("Query2"). This inlay mean that there would be two calls into the resolve placeholder function by the data binding web service. One call with a list of two PH objects (IDs 1 and 2) with "Query1" as the source and another call with a different PH object (ID 3) in the list and "Query2" as the data source. Going a bit deeper into the explanation, an administrator may implement a function (such as resolveQuery1(data, list) function) that would execute a pre-defined query on the backend or data asset source database, for example, that retrieves a customer's name and address information. The query can be made with the help of the customer ID node in the data, and information from the query result (that may be a specific customer table row) can be set into each PH object using the @custom PH information In the example, for PH ID 1, @custom was set to "firstName" while for PH ID 2, @custom, was set to "address." Using this information, the code may know that the firstName column data from the query result is the value for PH ID 1 and the address column data is the value for PH ID 2.

The code may then set the values on the PH objects and return. When setting the values on the PH objects, any boilerplate text that is part of the PH's text (@text) may be retained. For example, PH ID 1 has @text='Dear {first Name}'. Once the first name data is resolved (e.g., "Steve") and set into the PH object returned to the framework, the PH object's value may become "Dear Steve" where "Dear" is boilerplate text that is part of the placeholder and is not replaced by the resolved PH value. Once the data binding web service has completed iterating through the collection of PHs via the interface function (e.g., by calling resolve placeholders function for each subset of similarly-sourced placeholders), the data binding web service may create the XML-encoded response string (or data binding response) from the PH list and return it to the caller (e.g., a document such as XFA-PDF document in a letter filling experience) as shown at 270 in the method 200 of FIG. 2. Once the response is received, the resolved PH values may be distributed into the document as shown at 280 and the method 200 may end at 290 or continue at 230.

Figure 7:
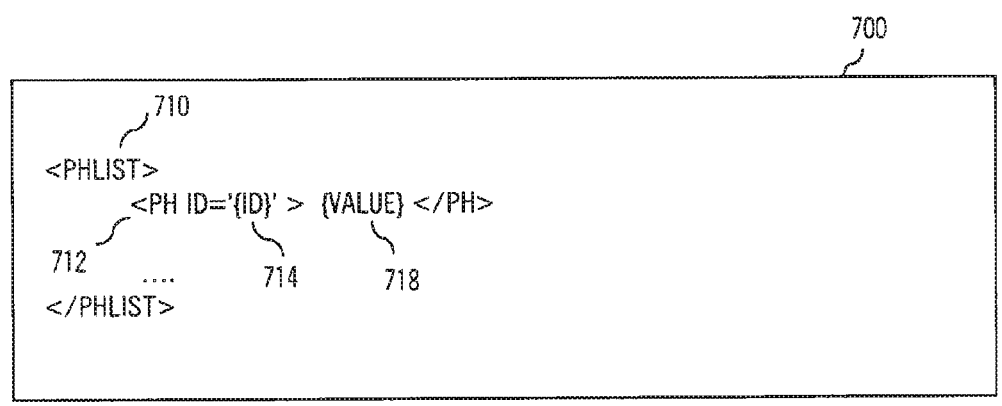
FIG. 7 illustrates a data binding web service response that may be generated by a data binding web service and transmitted to an interactive document for use in replacing placeholders with data values.

The data binding web service response as shown at 700 in FIG. 7 may contain a list 710 of placeholders (e.g., the same listing as found in the data binding request), but each node 712 would include a PH ID 712 and also a resolved data value(s) 718 associated with the placeholder ID 712. The data binding web service may create a data binding response 700 that may be a single XML-encoded string. Since it is dynamically generated at runtime and the web service is invoked programmatically without using import/export bindings on the data fields (but in other cases, import/export bindings on hidden fields may be used to communicate with the DBWS). The data value 718 may be a simple string or it may take other forms such as a repeatable XML node for a list of values of a single placeholder (such as <item default='*0|1'>{value}</item> where @default is optional and identifies the item that contains the list's default value if specified and set to '1'). Following the ongoing example discussed herein, the data binding response may contain the following data (note the correlation between these results and the resulting values in the DD example above): for PH ID 1, the value may be "Dear Steve"; for PH ID 2, the data value returned may be "343 Preston Street"; and for PH ID 3, the values maybe "<item default='1'>Visa</item>    <item>MasterCard</item> <item>Amex</item>".

Given the response data, the initialization script may set the value of the data fields (e.g., using the IDs to match) to the data returned from the data binding wet) service, which would, in turn, result in the PHs reflecting the new values within their respective content in the PDF or document inside the letter or form filling experience. In the case of PH ID 3 (e.g., the list of credit card types), the data field would be assigned the default item's value (e.g. if no default is identified in the response, the data field would not get a default value) and the data field, being a drop down list in this example, may get three new items to choose from: "Visa", "MasterCard", and "Amex". A letter filling experience guide on the server/machine may then expose the drop down list in the document so that the user operating a client node may make a selection.

Figure 8:
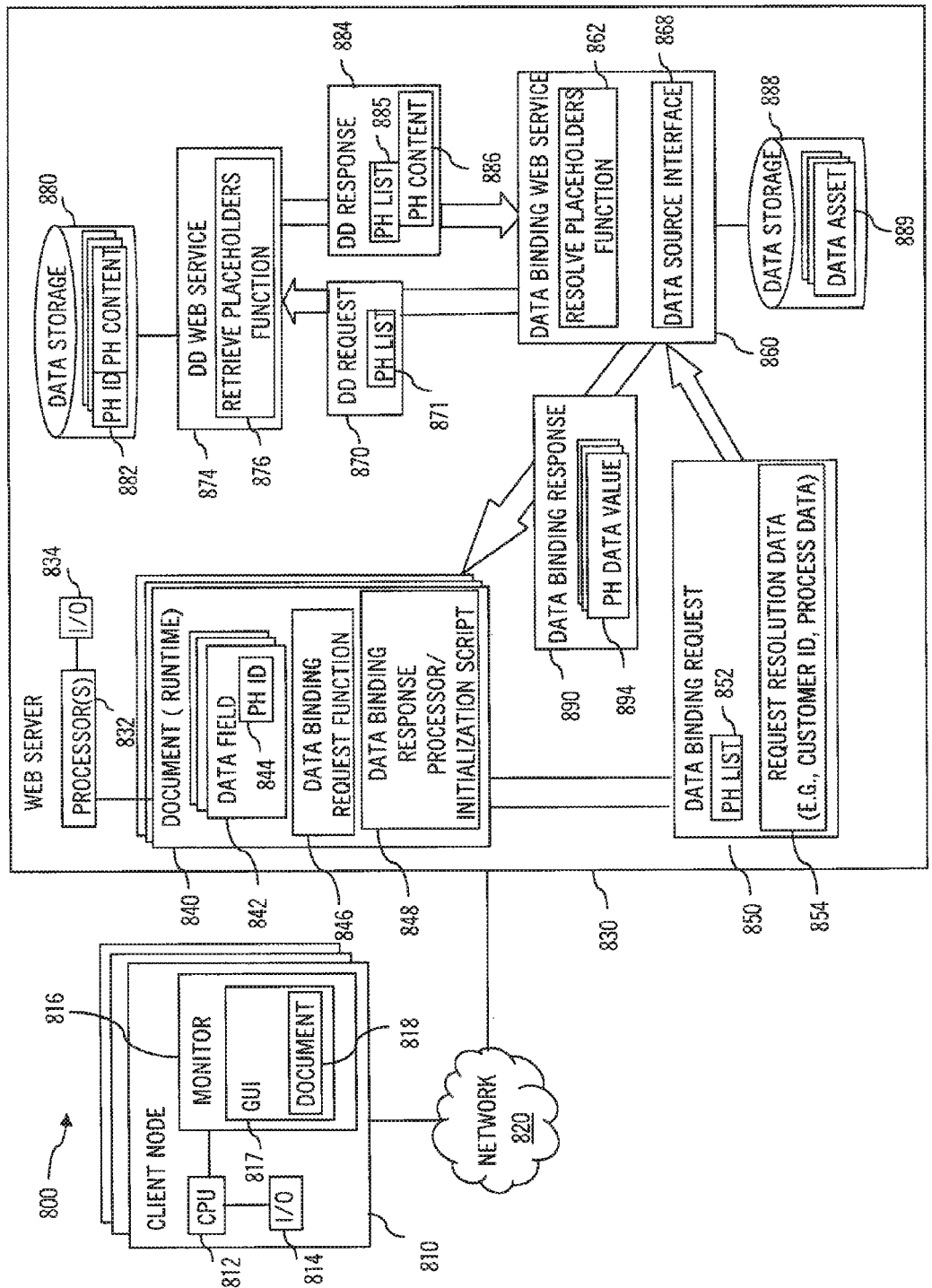
FIG. 8 illustrates an embodiment of a computer system or network that may implement an abstracted data binding method during document filling or serving experiences or operations.

FIG. 8 illustrates a system 800 in which data binding may be provided using the abstraction techniques described herein (e.g., via the process 200 of FIG. 2). System 800 is similar to system 100 but shows that many of the components may be provided on a single wet) server (or box/machine/system) 830. As shown, the system 800 may be used to allow a set or number of client nodes 810 to access the web server 830 via a digital data communications network 820 (the Internet, an intranet, or the like) In operation of system 800, each client node 810 may be nearly any computer or electronic device adapted for communicating with server 830 over network 820 such as a personal computer, a wireless communication device, or the like. Each client node 810 may be operated by a user such as to request and interact with a letter or form (e.g., provide user data via a form or letter filling experience or to produce documents for transmittal to customers or the like). Each node 810 may include a processor 812 that runs input/output devices 814 such as a keyboard, mouse, touchscreen, and the like to receive user input data. The node 810 also includes a monitor or display 816 that is used to display a GUI 817 and/or document 818 as may be provided or served by web server 830 (e.g., a document as discussed above as being a runtime version of a template with data fields that include placeholders).

The system 800 includes a web server 830 that includes a processor 832 that runs I/O devices 834 such as to allow an operator to create templates for documents 840 and to create a data directory in data storage 880 as shown by sets of entries 882 in a database that include placeholder IDs along with placeholder content (e.g., information for resolving the placeholders into data values such as source information or information useful for determining a source). The processor 832 may also execute or run code/instructions to provide an interactive document 840 (e.g., based on a template), a data binding web service 860, and a data dictionary (DD) web service 874. These code components may be provided on computer-readable medium and configured to cause the processor 832 (and web server 830) to provide the functions described herein (such as discussed in method 200 of FIG. 2).

The document 840 includes data fields 842 as may be defined in a template to include placeholders or handles providing a link to data in a data source 888 and as identified by PH IDs 844. The document 840 also includes intelligence including a data binding request function 846 and a data binding response processor (or initialization script) 848. During runtime, the data binding request function 846 may act to process the data fields to find/identify each PH ID 844 and to generate a data binding request 850 via a communication link with data binding web service 860. The data binding request 850 may include a list of PHs (or PH IDs) 852 from the document 840 and may also include request resolution data 854 that may be used by the data binding web service 860 to resolve the PH IDs into data values (e.g., customer/client IDs, process data, document data, and so on that may be used to determine which data assets 889 are relevant to the document 840, data fields 842, and/or placeholders 844). The function 846 may be thought of as a request placeholder resolution function that collects the IDs from PHs 844, builds the XML-encoded (in some cases) request 850, and sends it to the data binding web service 860. The initialization script 848 acts to process returned data binding responses 890 with PH data values 894 so as to modify the document 840 to display or include the data values associated with each placeholder 844 (e.g., replace the placeholders 844 in the data fields 842 with actual data rather than the mere abstraction of data and data asset locations provided by the PHs).

The server 830 further includes a data binding web service 860 that includes a resolve placeholders function 862 along with a data source interface 868. The function 862 acts to process the data binding request 860 and generate a data dictionary request 870 that is transmitted to or used to interface with the DD web service 874. The DD request 870 includes a list 871 of placeholders based on the list 852 of PHs to be resolved into data. The DD web service 874 uses its retrieve placeholders function 876 to process the DD request 870 to access a DD directory in data storage device 880 that includes a listing or array of entries 882 with PH IDs and also sets or fields of PH content, which may include source information that may be used to locate a data storage or data source 888 of data assets 889 associated with the placeholders 844 of a document 840. The retrieve placeholders function 876 also acts to generate a DD response 884 that is returned to the data binding web service 860 and that includes a PH list 885 along with PH content 886 for each placeholder. The resolve placeholders function 862 then uses this information to place a call via data source interface 868 on data storage or data sources 888 to access data assets 889 identified and/or associated with PHs in the list 886. With the data assets, the resolve placeholders function 862 acts to create and return the data binding response 890 to the document 840 including PH IDs and PH data values 894. The data binding response processor 848 then uses these data values to replace the PH IDs in the document. The processor or apply placeholders function 848 takes the web service response 890 and applies the resolved PH values 894 into their respective data fields 842 throughout the PDF 840 (and in document 818).

Although the invention has been described and illustrated with a certain degree of particularity, it is understood that the present disclosure has been made only by way of example arid that numerous changes in the combination and arrangement of parts can be resorted to by those skilled in the art without departing from the spirit and scope of the invention, as hereinafter claimed. Embodiments, such as the systems shown in FIGS. 1 and 8 and the method 200 of FIG. 2, of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus (such as the web services, the document and its intelligence/functions/scripts, and so on). The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring sub separation in all embodiments, and it should be understood that the described program components and systems can generally be integrated together in a single software and/or hardware product or packaged into multiple software and/or hardware products.

The functions and data binding methods described herein may be provided as a computer program product that may include a computer useable medium and computer readable code embodied on the computer useable medium, such as one used for providing an interactive document with data binding abstractions. In such implementations, the computer readable code may include computer readable program code devices causing a computer to receive from a runtime document a list of placeholder identifiers. Also, the computer readable code may include computer readable program code devices causing the computer to access a data dictionary database with the list of placeholder identifiers to associate a set of placeholder content with each of the placeholder identifiers in the list of placeholder identifiers. Further, the code may include computer readable program code devices causing the computer to determine a data source for a data value associated with each of the placeholder identifiers from the sets of placeholder content, and, also, it may include computer readable program code devices causing the computer, for each of the placeholder identifiers, to access the data source and obtaining the data value. The code may further include computer readable program code devices causing the computer to transmit a data binding response to the runtime document that includes the placeholder identifiers and the obtained data values.

We claim:

1. A computer-implemented method, comprising:
    serving an interactive document to a client via a communications network, the interactive document comprising a data field with a placeholder for a data value, the data field being free of a data binding to a source of the data value;
    receiving a request to resolve the placeholder of the interactive document;
    generating a data dictionary request including a placeholder identifier associated with the placeholder;
    processing a data dictionary response including placeholder content associated with the placeholder identifier;
    accessing the source to obtain the data value using the placeholder content; and
    providing a data binding response to the interactive document including the placeholder identifier and the data value.

2. The method of claim 1, wherein the request to resolve the placeholder comprises the placeholder identifier and request resolution data used by a data binding web service in the accessing of the source to obtain the data value.

3. The method of claim 2, wherein the request resolution data comprises data entered into the interactive document with the client during the serving of the interactive document.

4. The method of claim 1, wherein the data dictionary response is generated by a data dictionary web service providing an interface to a data dictionary database, wherein the data dictionary database includes a plurality of entries that each include a placeholder identifier and each further include a set of placeholder content, and wherein the placeholder content is associated with source information used during the processing of the data dictionary response to determine the source of the data value.

5. The method of claim 4, wherein the entries of the data dictionary database provide no bindings to a location of the source.

6. The method of claim 1, further comprising:
    with a data binding response processor in the interactive document,
        processing the data binding responses; and
        replacing the placeholder in the interactive document with the data value provided in the data binding response.

7. The method of claim 1, wherein the serving of the interactive document comprises rendering the interactive document from a template, the rendering providing a plurality of data fields each with a placeholder for a data value and each without a static data binding reference for the data value.

8. A non-transitory computer readable medium embodying instructions which, when executed by a computer, cause the computer to:
    receive from a runtime document a list of placeholder identifiers associated with data fields of the runtime document, the runtime document being rendered from a template, the data fields being free of data bindings to sources of data values for the data fields;
    access a data dictionary database with the list of placeholder identifiers to associate a set of placeholder content with each of the placeholder identifiers in the list of placeholder identifiers;
    determine a data source for a data value associated with each of the placeholder identifiers from the sets of placeholder content;
    for each of the placeholder identifiers, access the data source and obtain the data value; and
    transmit a data binding response to the runtime document that includes the placeholder identifiers and the obtained data values.

9. The computer readable medium of claim 8, wherein the runtime document comprises the data fields each including a placeholder associated with one of the placeholder identifiers, the data values being inserted in place of the placeholder identifiers in the data fields.

10. The computer readable medium of claim 8, wherein neither of the runtime document and the data dictionary database includes static data binding references to data sources associated with the data values.

11. The computer readable medium of claim 8, wherein the instructions further cause the computer to:
    render the runtime document using a template stored in memory, wherein the template generates a data binding request including the list of placeholder identifiers and processes the data binding response to merge the obtained data values into the runtime document in place of the placeholder identifiers.

12. The computer readable medium of claim 8, wherein the placeholder content identifies the data source for each of the placeholder identifiers without providing a static location reference to the data source.

13. A computer system, comprising:
    a processor; and
    data storage in communication with the processor storing:
        a database with entries that each include a placeholder identifier and a set of placeholder content including a data source identifier; an interactive document module comprising a data binding request module; and a data binding web service module;
    wherein the interactive document module is run by the processor to serve an interactive document, wherein the served interactive document includes a set of data fields that each include a placeholder, the set of data fields being free of data bindings to sources of data values for the data fields,
    wherein the data binding request module is run by the processor to issue a data binding request with a list of identifiers for the placeholders; and wherein the data binding web service module is run by the processor to resolve placeholders by processing the data binding request, by accessing the database, and by transmitting a data binding response to the served interactive document providing the list of placeholder identifiers and a data value associated with each of the placeholder identifiers.

14. The system of claim 13, wherein the accessing of the database with the data binding web service module comprises transmitting a request with the list of placeholder identifiers and receiving, in response, a set of placeholder objects that each include one of the placeholder identifiers and an associated one of the sets of placeholder content.

15. The system of claim 14, further comprising a data dictionary web service module run by the processor to process the request from the data binding web service module, retrieve the sets of placeholder content, and generate the set of placeholder objects.

16. The system of claim 14, wherein the data binding web service module is run by the processor to determine a source based on the data source identifier in each of the sets of placeholder content and to call a data source interface to obtain the data values from the determined sources.

17. The system of claim 16, wherein the data binding request further comprises request resolution data associated with each of the placeholder identifiers and wherein the sources are determined in part based on the request resolution data.

18. The system of claim 13, wherein the interactive document comprises a runtime rendering of a template and wherein the runtime rendering produces no static data source references for the data fields.

19. The system of claim 13, wherein the interactive document further comprises a function that processes the data binding response to replace the placeholders in each of the data fields with a corresponding one of the data values.

20. The system of claim 13, wherein the data source identifier comprises a name of a data source storing a number of the data values.

* * * * *